(12) United States Patent
Surazski

(10) Patent No.: US 7,590,230 B1
(45) Date of Patent: Sep. 15, 2009

(54) AUTOMATED CONFERENCE RECORDING FOR MISSING CONFERENCE PARTICIPANTS

(75) Inventor: Luke K. Surazski, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1212 days.

(21) Appl. No.: 10/444,793

(22) Filed: May 22, 2003

(51) Int. Cl.
H04M 3/42 (2006.01)
H04M 1/00 (2006.01)

(52) U.S. Cl. .................................. 379/202.01; 379/158

(58) Field of Classification Search ............ 379/202.01, 379/205.01, 207.01, 207.02, 207.11, 158, 379/203.01, 204.01
See application file for complete search history.

(56) References Cited

U.S. PATENT DOCUMENTS

| | | | |
|---|---|---|---|
| 4,965,819 A * | 10/1990 | Kannes | 348/14.07 |
| 5,382,972 A | 1/1995 | Kannes | 348/15 |
| 5,483,588 A | 1/1996 | Eaton et al. | 379/202 |
| 5,572,377 A | 11/1996 | Ueno | 360/31 |
| 5,668,863 A | 9/1997 | Bieselin et al. | 379/202 |
| 5,710,591 A * | 1/1998 | Bruno et al. | 348/14.09 |
| 6,275,575 B1 * | 8/2001 | Wu | 379/202.01 |
| 6,583,806 B2 * | 6/2003 | Ludwig et al. | 348/14.08 |
| 6,608,636 B1 * | 8/2003 | Roseman | 715/753 |
| 6,668,044 B1 * | 12/2003 | Schwartz et al. | 379/68 |
| 6,870,916 B2 * | 3/2005 | Henrikson et al. | 379/202.01 |
| 2001/0002927 A1 * | 6/2001 | Detampel, Jr. et al. | |
| 2001/0005372 A1 * | 6/2001 | Cave et al. | |
| 2002/0034164 A1 * | 3/2002 | Sjoholm et al. | |
| 2002/0143877 A1 * | 10/2002 | Hackbarth et al. | |
| 2003/0158900 A1 * | 8/2003 | Santos | |
| 2004/0235509 A1 * | 11/2004 | Burritt et al. | |

* cited by examiner

Primary Examiner—William J Deane
(74) Attorney, Agent, or Firm—Baker Botts L.L.P.

(57) ABSTRACT

A conferencing system provides automated recording of conference media using a recording module. The recording module connects with conferences and records these conferences automatically. In certain circumstances, such as when all key invitees have joined a conference, the recording module stops recording and deletes recorded media for the conference.

29 Claims, 2 Drawing Sheets

AUTOMATED CONFERENCE RECORDING FOR MISSING CONFERENCE PARTICIPANTS

TECHNICAL FIELD OF THE INVENTION

The present invention relates generally to conference systems and, more particularly, to automated conference recording for missing conference participants.

BACKGROUND OF THE INVENTION

Conferencing technology enables three or more callers to participate in a single telephone call. This technology has become firmly entrenched as an invaluable tool in both business and personal settings.

SUMMARY OF THE INVENTION

In accordance with the present invention, techniques for automated conference recording for missing conference participants are provided. According to particular embodiments, these techniques enable the storage of media from a conference such that missing conference participants can later access and replay the stored media. In particular embodiments, a recording module monitors participants of a conference and, if key participants do not join the conference, stores the media from the conference so that the participants may later access the stored media.

According to a particular embodiment, a method for automated recording of conference media determines key invitees for a scheduled conference, connects to the scheduled conference, and initiates recording of conference media from the scheduled conference into a conference media file. During the conference, the method monitors participants in the scheduled conference and determines whether all of the key invitees have joined as participants in the scheduled conference. If all of the key invitees have joined the scheduled conference, the method stops the recording of the conference media and deletes the conference media file.

Embodiments of the invention provide various technical advantages. These techniques can help increase productivity and usefulness of conference calls. For example, the system enables conference invitees and key conference participants to listen to previously recorded conferences, which can in turn increase the effectiveness of these conferences and increase productivity.

According to particular embodiments, the system automatically records only selected conferences. For example, the system may automatically record only those conferences in which key invitees do not join the conference. This can significantly reduce size and cost requirements for memory, since the system only stores selected conferences.

In addition, selected embodiments also provide for simplified access to recording services. For example, particular embodiments enable a conference moderator or other suitable individual to set up an upcoming conference and to identify key invitees of the conference. The system then provides automatic recording of the subsequent conference based on the attendance of the conference invitees.

Other technical advantages of the present invention will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
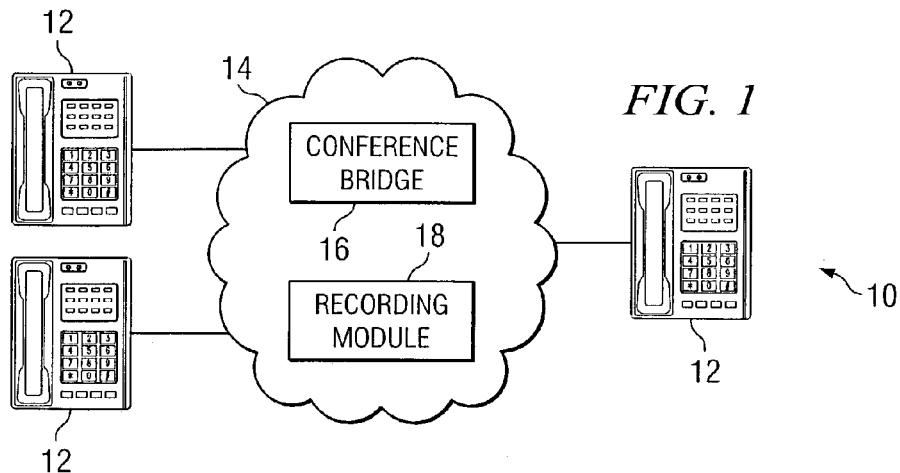
FIG. 1 illustrates a communication system that includes a conference bridge, conference participants and a recording module that operates according to particular embodiments of the present invention.

FIG. 1 illustrates a communication system, indicated generally at 10, that includes multiple telephony devices 12 interconnected by a communication network 14. Within network 14, a conference bridge 16 provides conferencing services for one or more devices 12. Network 14 also includes a recording module 18, which provides conference media recording services. In particular, recording module 18 may provide scheduling, notification, recording, and replay services associated with conferences supported by conference bridge 16.

Devices 12 each represent telephony equipment, including hardware and any appropriate controlling logic, for participating in voice communication sessions. For example, devices 12 may include traditional telephones, mobile phones, packet-based phones, specially enabled computers, or any other appropriate voice communication device. Moreover, devices 12 may provide more advanced communication services, such as video communication services. In the embodiment illustrated, devices 12 interconnect using network 14. Network 14 represents any suitable combination and arrangement of network equipment operable to transport communications. Network 14 may include private networks, public networks, such as portions of the Internet or public-switched telephone network (PSTN), or any other suitable communications equipment.

To provide conferencing services to devices 12, network 14 includes conference bridge 16. Conference bridge 16 represents any suitable combination and arrangement of hardware, including any appropriate controlling logic, that can facilitate voice and/or other media communication sessions between three or more devices 12. While illustrated as a separate box within network 14, system 10 contemplates the functions of conference bridge 16 being incorporated within or distributed among any suitable elements. Thus, for example, the functions of conference bridge 16 may be provided within selected devices 12 or within any suitable elements of network 14.

Recording module 18 represents any suitable hardware, including controlling logic, that provides extended conferencing services to support automated recording of conference media for some or all missing invitees of a conference. To support conference media recording, recording module 18 may provide any number of suitable services, such as conference scheduling, notifications, recording, and replay. Scheduling services enable individuals to set up a conference that may potentially provide recording of conference media. For example, recording module 18 may present a graphical user interface that permits an individual to set up a conference time, identify invitees for the conference, and request recording settings for the conference. Recording settings may, for example, enable a user to request automated recording only for key missing invitees, for any missing invitees, or may disable conference recording. To indicate invitees of a conference, recording module 18 may support any suitable protocol. Thus, for example, an individual may specify invitees using telephone numbers, network addresses, and/or suitable addresses. Recording module 18 may then use the invitee addresses to provide notifications to the invitees, to identify missing participants during the scheduled conference, or for other suitable purposes. During conference set up, recording module 18 may further allow a user to identify key invitees. These indications may allow recording module 18 to later determine whether or not to record and/or save conference media based upon participants in the conference.

In addition to conference scheduling, recording module 18 may also support notification services. According to particular embodiments, recording module 18 provides notifications and updates to conference invitees at appropriate times. For example, after a conference has been scheduled, recording module 18 may send conference notices to each of the invitees scheduled for the conference. These notifications can provide any suitable information. In some circumstances, these notifications may provide contact addresses and pass codes for the conference. For example, a notice may indicate a telephone number for conference bridge 16 and a pass code associated with the particular scheduled conference. Moreover, to enable differentiation between the various participants in the scheduled conference, the notifications may include personalized pass codes. This enables recording module 18 to identify whether key invitees have joined the conference and to determine whether or not to automatically record and save conference media. However, personalized access codes may not be necessary if recording module 18 uses other techniques for identifying participants in a conference. Therefore, the notifications and access methods for conference participants will vary based upon the features supported by devices 12 and conference bridge 16.

Recording module 18 also supports conference media recording services. With these services, recording module 18 provides recording of conference media for some or all missing invitees of a conference. For example, for a scheduled conference, recording module 18 may determine key invitees and connect with the conference at the scheduled time. Recording module 18 may begin recording the conference while monitoring the participants who have joined the conference. So long as the key invitees have not joined, recording module 18 may continue recording the conference. Recording module 18 can then save the conference media for later playback to the missing invitees.

According to particular embodiments, recording module 18 also supports automated recording of ad hoc conferences that are not scheduled in advance of the conference. For example, a user may access a meet-me conference feature and identify a number of invitees for the conference. This can serve as an instant "scheduling" of the conference. If some of the invitees fail to respond to the conference request, recording module 18 may use techniques such as those described above to record and save conference media from the conference.

In some systems, meet-me conference features and other similar functions that enable "reservationless" conferencing may have associated owners of the features. However, despite having an owner, a meet-me conference feature may permit other users to conduct a conference without the participation of the owner. In these circumstances, the owner may wish to have the resulting conference recorded. Therefore, recording module 18 may also support the recording of conference media from these types of conferences that take place without the owner participating in the conference.

Additionally or alternatively, recording module 18 may monitor participants of a communication session and automatically record conference media on behalf of key participants that drop out of a conference. For example, mid-way through a conference, one of the key invitees may disconnect. Upon detecting this event, recording module 18 may begin recording conference media. If the conference continues for greater than some threshold period of time, recording module 18 may save the conference media for later playback to the missing key invitee. If, for example, only some small amount of additional conference occurred after the key invitee disconnected, recording module 18 may choose not to save the conference media. However, in addition to these particular described examples, system 10 contemplates recording module 18 linking to and recording conference media from any suitable conferences at any appropriate times using techniques such as those described.

Recording module 18 may store recorded conference media for any appropriate period of time. Recording module 18 may maintain a conference media recording until all those key invitees that missed the conference have accessed and replayed the media. Alternatively, or in addition, recording module 18 may store a conference media recording for a predetermined or configured period of time. As another alternative, recording module 18 may use other techniques for distributing recorded conference media to missing invitees. For example, recording module 18 may generate a recorded media file and email or otherwise distribute the media file to the missing invitees from the conference.

Recording module 18 may also provide for replay of stored conference media. For example, an invitee that missed a recorded conference or some other suitable individual may contact replay module 18 and request playback of the recorded media from the conference. Recording module 18 can access the recorded media and provide a media stream to the requesting individual.

Also, during playback of stored media, recording module 18 may accelerate the speed of playback. To provide the accelerated replay, recording module 18 may use any suitable techniques. According to particular embodiments, recording module 18 uses a pitch-invariant time-scale-modified playback technique to replay stored audio. With pitch-invariant time-scale-modified playback, a digital signal processing algorithm time compresses an audio stream without changing pitch. For example, a particular time invariant playback scheme separates audio into frames, overlaps the frames a sufficient amount to achieve a target time compression, aligns the frames to prevent audio abnormalities that may result from phase changes at the boundaries and then adds the frames together. By using pitch-invariant time-scale-modified playback, recording module 18 can quickly replay a media stream without subjecting that participant to "chipmunk" voices during playback.

System 10 contemplates recording module 18 using any appropriate speed for replaying conference audio streams. Particular embodiments envision recording module 18 using speeds less than three times normal playback speed, with a default at approximately two times normal playback speed. However, because each playback by recording module 18 potentially involves a different listener and speakers, recording module 18 may support user selected replay speeds.

Thus, using a variety of services, recording module 18 enables the automated recording of conference media. These services can provide a variety of benefits, including increased productivity, reduced storage requirements, and simplification of conference procedures. For example, since recording module 18 may record only those conferences with missing key invitees, the number of recorded conferences may be relatively small, which reduces the need for high capacity storage systems. However, while particular services are described above with respect to recording module 18, system 20 contemplates recording module 18 providing any suitable services for supporting the automated recording of conference media.

In the embodiment illustrated, recording module 18 is depicted as an element within network 14. However, system 10 contemplates the distribution of functions from recording module 18 among any suitable element. For example, in addition to providing typical conferencing services, conference bridge 16 may also incorporate the functions of recording module 18. Similarly, selected devices 12 may provide some or all of the features of recording module 18, whether or not these devices 12 provide conferencing features such as those provided by conference bridge 16.

Figure 2:
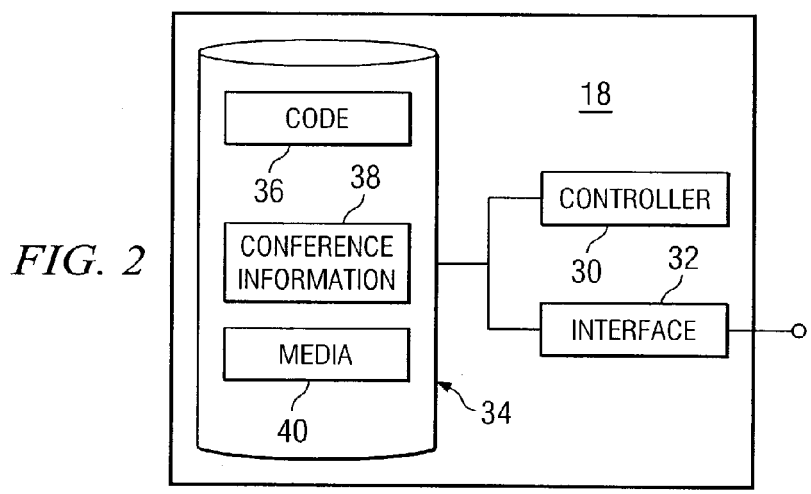
FIG. 2 is a block diagram illustrating an exemplary recording module from the system.

FIG. 2 is a block diagram illustrating exemplary functional components for recording module 18. In the embodiment illustrated, recording module 18 includes a controller 30, an interface 32, and a memory 34. In general, these elements of recording module 18 operate to provide services to support automated recording of conference media for missing conference invitees.

Controller 30 represents any suitable element or elements for controlling the operation of recording module 18. For example, controller 30 may represent a microprocessor or other similar element. Interface 32 represents any suitable hardware and/or logic enabling access to the functions of recording module 18. According to particular embodiments, recording module 18 may be implemented within elements of network 14. In these circumstances, interface 32 may enable network communication with other elements, such as conference bridge 16 and devices 12. In other embodiments, the functionality of recording module 18 may be implemented within other elements, such as within conference bridge 16 or selected devices 12. In these circumstances, interface 32 may represent hardware or logic modules for interfacing with other components and/or logic operating within the device. Thus, as shown by these two basic embodiments, the configuration and operation of interface 32 depends upon the particular implementation and location of recording module 18.

In the embodiment illustrated, recording module 18 also includes memory 34, which maintains code 36, conference information 38, and conference media 40. Code 36 represents software modules, configurations, and/or other suitable logic for use by recording module 18 during operation. For example, code 36 may include software for execution by controller 30 to provide services supporting automated recording of conference media. Conference information 38 includes information detailing scheduled conferences. For example, conference information 38 may include data detailing scheduled times, invitees, and recording options for any number of scheduled conferences. Media 40 includes stored conference media from one or more conferences. However, while memory 34 is illustrated as maintaining particular types of information, system 10 contemplates memory 34 storing any suitable information for use by recording module 18 for providing conference recording services.

During operation, recording module 18 provides various services to support recording of conference media. As previously discussed, these may include services such as conference scheduling, notifications, media recording, and media replay. To schedule a conference, a user contacts recording module 18, for example, using one of devices 12 or some other suitable accessing device. The user then schedules the conference by providing information such as a time, invitees, and recording options. As previously discussed, the user may specify key invitees and select to automatically record the scheduled conference only if some of those key invitees do not join the conference. With the information supplied by the user, recording module 18 can generate an entry within conference information 38 for a scheduled conference.

Using the information maintained within conference information 38, recording module 18 can schedule automated recording of conferences and provide notifications to invitees. For example, when a conference is initially scheduled and/or at other appropriate times, recording module 18 can provide notices of the upcoming conference to scheduled invitees. As previously discussed, these notifications may include any suitable information, such as conference numbers and pass codes.

Recording module 18 also, at appropriate times, connects to conferences and automatically records conference media. For example, consider recording module 18 having a scheduled conference within conference information 38 indicating an upcoming conference on conference bridge 16. At or near the scheduled time for the conference, recording module 18 connects with the conference on conference bridge 16. As another example, consider conference bridge 16 conducting a meet-me conference or conducting a conference having a number of key invitees in attendance. If requested invitees fail to show up or key invitees disconnect from the conference, conference bridge 16 may request that recording module 18 connect and provide recording services. Therefore, as previously discussed, system 10 contemplates recording module 18 connecting to conference bridge 16 and recording conference media for any number of different circumstances.

To connect, recording module 18 uses appropriate communication protocols depending upon the type of conference. For example, for a traditional telephone conference, recording module 18 may connect with a specific telephone number assigned to the conference. For a packet based conference, recording module 18 may simply register to receive conference media packets from conference bridge 16. Thus, the particular method used for recording module 18 to connect with conferences depends upon the conferencing technology in use. Moreover, if the functions of recording module 18 are incorporated within conference bridge 16, this may also affect the manner in which recording module 18 connects with scheduled and/or ongoing conferences.

Once connected to a conference, recording module 18 may begin recording conference media at any appropriate time. For example, recording module 18 may begin recording conference media at or before the conference is scheduled to begin. Recording module 18 then monitors participants in the conference to determine whether key invitees have joined. Once all key invitees have joined the conference, recording module 18 may discontinue recording. This prevents the unnecessary recording of conferences when all key invitees are present. In addition to stopping the automatic recording, recording module 18 may also delete any recorded conference media once all key invitees have arrived. However, recording module 18 may maintain the recorded conference media so that the invitees may replay missed portions of the conference before they joined.

If all of the key invitees do not join the conference by a predetermined time, recording module 18 saves the conference media for later replay. To determine whether all key invitees have joined a conference, recording module 18 may use any suitable techniques. According to particular embodiments, as previously discussed, recording module 18 may provide for automated identification of connecting conference participants based upon their addresses and/or accessing information provided to conference bridge 16. However, recording module 18 may use any appropriate methods for identifying conference participants. Based upon the participants of a conference, recording module 18 can determine whether or not to record and save the conference media. After recording a conference, recording module 18 may also provide notifications to missing invitees that the recording is available. As previously discussed, recording module 18 may use any suitable techniques for delivering the recorded media. Moreover, recording module 18 may deliver the recorded media to any appropriate recipients.

However, while FIG. 2 and the preceding description focus on particular embodiments of recording module 18 that includes specific elements providing particular services, system 10 contemplates recording module 18 having any suitable combination and arrangement of elements providing services to support conference media recording. Thus, the functionalities performed by the particular elements illustrated may be separated or combined as appropriate, and functionalities of some or all of these elements may be implemented by logic encoded in media. Moreover, as previously discussed, some or all of the functionalities of recording module 18 may be distributed among other elements of system 10.

Figure 3:
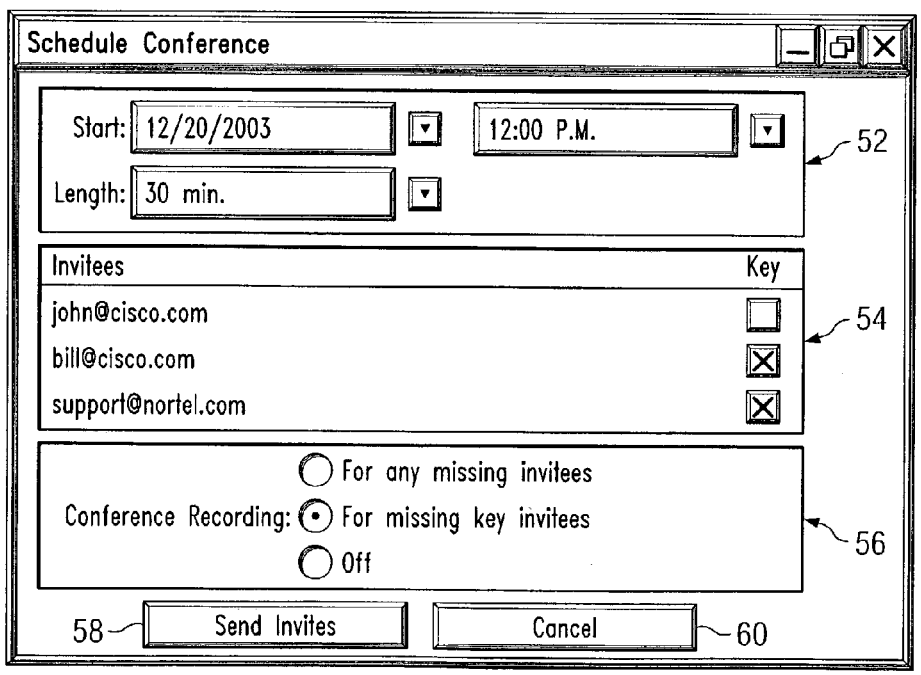
FIG. 3 is an exemplary user interface for scheduling a conference with media recording services.

FIG. 3 is a graphical user interface, indicated generally at 50, that provides access to and interaction with the functions of recording module 18. During operation, conference bridge 16 and/or recording module 18 may present interface 50 to devices 12 or other appropriate devices to permit user interaction with the features of recording module 18. Interface 50 includes a number of sections for providing information about a scheduled conference, including a time section 52, an invitee section 54, and a conference recording options section 56. Interface 50 also includes a send invites button 58 and a cancel button 60.

Within time section 52, a user can specify start and stop times for scheduling a conference. However, while interface 50 permits a user to indicate a length for a conference, recording module 18 may automatically record conferences of variable lengths by detecting when all conference participants have disconnected with the conference. Within invitees section 54, the user can identify invitees to the scheduled conference. In the embodiment illustrated, invitees section 54 further permits the user to specify whether each invitee is a key invitee. In the example shown, interface 50 permits the identification of invitees using network/email addresses. However, as previously discussed, recording module 18 may support any suitable techniques for indicating and identifying invitees for a conference. Within recording options sections 56, the user can specify whether or not to automatically record the scheduled conference. Moreover, the user can specify whether to automatically record the conference for any missing invitees or only for missing key invitees.

Thus, during operation, a user may access interface 50 to schedule an upcoming conference and to request automatic recording of the conference. After scheduling the conference and identifying invitees, the user can confirm the conference and send invites by selecting send invites button 58. Alternatively, the user can cancel the operation of interface 50 by selecting cancel button 60.

While interface 50 is illustrated and described as including particular fields and interface mechanisms, system 10 contemplates using any suitable interfaces and techniques for accessing the features of recording module 18. Thus, while interface 50 illustrates a rather advanced graphical interface, system 10 contemplates devices accessing the features of recording module 18 using any suitable techniques. Moreover, the particular methods used to access the features of recording module 18 may depend upon the sophistication and compatibility of the device accessing the features.

Figure 4:
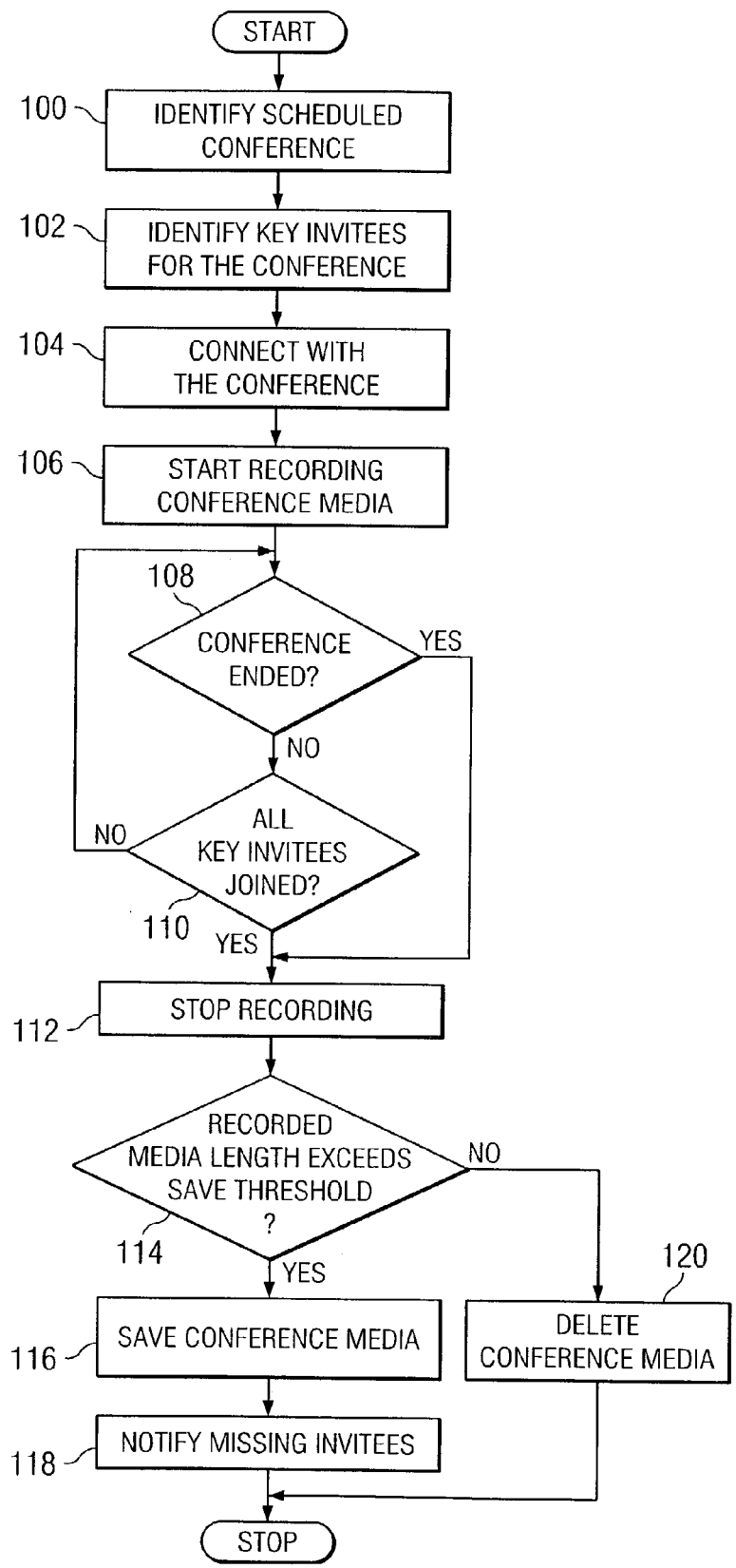
FIG. 4 is a flowchart illustrating a method for scheduling and conducting a conference that provides media recording services.

FIG. 4 is a flowchart illustrating a method for automatically recording conference media. Recording module 18 identifies a scheduled conference at step 100. For example, recording module 18 may access conference information 38 and determine when a conference is scheduled. Recording module 18 identifies key invitees for the conference at step 102. For example, the information within conference information 38 may indicate invitees identified as key. Recording module 18 connects with the conference at step 104 and starts recording conference media at step 106.

While recording the conference, recording module 18 monitors participants in the conference and monitors for the end of the conference. If recording module 18 does not detect the end of the conference at step 108, recording module 18 determines whether all key invitees have joined the conference at step 110. Once the conference has ended, or all key invitees have joined the conference, recording module 18 stops recording at step 112. Recording module 18 then determines whether the recorded media length exceeds a save threshold at step 114. For example, recording module 18 may determine whether the recorded conference media is longer than ten minutes. By checking against this threshold, recording module 18 avoids saving the initial portions of a conference before all invitees are expected to have joined. If the recorded media length exceeds the save threshold, recording module 18 saves the conference media at step 116 and notifies missing invitees at step 118. This enables the missing invitees to then access and play back the recorded conference media. However, if the recorded media length does not exceed the threshold, recording module 18 deletes the conference media at step 120.

The preceding flowchart and accompanying description illustrate a particular method for recording module 18 to provide automated recording of conference media. However, the preceding flowchart and accompanying description illustrate only an exemplary method of operation, and system 10 contemplates recording module 18, devices 12, and/or other suitable components using any appropriate techniques to provide conference media recording functionality. Thus, many of the steps in this flowchart may take place simultaneously and/or in different orders than as shown. In addition, recording module 18 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for automated recording of conference media comprising:
　　determining key invitees for a scheduled conference;
　　connecting to the scheduled conference;
　　initiating recording of conference media from the scheduled conference into a conference media file;
　　monitoring participants in the scheduled conference;
　　determining whether all of the key invitees have joined as participants in the scheduled conference; and if all of the key invitees have joined the scheduled conference, stopping the recording of the conference media and deleting the conference media file.

2. The method of claim 1, further comprising:
   detecting completion of the scheduled conference;
   determining missing ones of the key invitees that did not join the scheduled conference; and
   notifying the missing invitees of the availability of the conference media file.

3. The method of claim 2, wherein the step of notifying comprises communicating an electronic mail message to each of the missing invitees.

4. The method of claim 3, wherein each of the electronic mail messages comprises a copy of the conference media file.

5. The method of claim 1, wherein the scheduled conference comprises a media communication session operable to interconnect media stream communications between at least three connecting participants.

6. The method of claim 1, further comprising:
   determining whether all of the key invitees have joined as participants in the scheduled conference after a predetermined period of time following a scheduled time for the schedule conference; and
   if all of the key invitees have not joined the scheduled conference by the end of the predetermined period of time, saving the conference media file for later access by any missing participants.

7. The method of claim 1, further comprising, prior to the scheduled conference, presenting a graphical user interface that includes fields for specifying a scheduled time and addresses for the key invitees.

8. The method of claim 1, further comprising, prior to the scheduled conference, determining all scheduled invitees for the scheduled conference and communicating a notice to each of the scheduled invitees, with each of the notices specifying parameters for the scheduled conference.

9. The method of claim 8, wherein each of the notices includes a contact address for the scheduled conference and a pass code, wherein the pass code from a notice distinguishes whether a scheduled invitee is one of the key invitees.

10. An automated conference media recording module comprising:
    a memory operable to maintain conference information, the conference information identifying a scheduled conference and key invitees for the scheduled conference;
    an interface operable to connect to the scheduled conference;
    a controller operable to initiate recording of conference media from the scheduled conference into a conference media file, to monitor participants in the scheduled conference, to determine whether all of the key invitees have joined as participants in the scheduled conference, and, if all of the key invitees have joined the scheduled conference, to stop the recording of the conference media and delete the conference media file.

11. The recording module of claim 10, wherein the controller is further operable to:
    detect completion of the scheduled conference;
    determine missing ones of the key invitees that did not join the scheduled conference; and
    notify the missing invitees of the availability of the conference media file.

12. The recording module of claim 11, wherein the controller is further operable to notify by communicating an electronic mail message to each of the missing invitees.

13. The recording module of claim 12, wherein each of the electronic mail messages comprises a copy of the conference media file.

14. The recording module of claim 10, wherein the scheduled conference comprises a media communication session operable to interconnect media stream communications between at least three connecting participants.

15. The recording module of claim 10, wherein the controller is further operable to:
    determine whether all of the key invitees have joined as participants in the scheduled conference after a predetermined period of time following a scheduled time for the schedule conference; and
    if all of the key invitees have not joined the scheduled conference by the end of the predetermined period of time, save the conference media file for later access by any missing participants.

16. The recording module of claim 10, wherein the controller is further operable, prior to the scheduled conference, to present a graphical user interface that includes fields for specifying a scheduled time and addresses for the key invitees.

17. The recording module of claim 10, wherein the controller is further operable, prior to the scheduled conference, to identify all scheduled invitees for the scheduled conference and to communicate a notice to each of the scheduled invitees, with each of the notices specifying parameters for the scheduled conference.

18. The recording module of claim 17, wherein each of the notices includes a contact address for the scheduled conference and a pass code, wherein the pass code from a notice distinguishes whether a scheduled invitee is one of the key invitees.

19. Logic for automated recording of conference media, the logic encoded in media and operable when executed to perform the steps of:
    determining key invitees for a scheduled conference;
    connecting to the scheduled conference;
    initiating recording of conference media from the scheduled conference into a conference media file;
    monitoring participants in the scheduled conference;
    determining whether all of the key invitees have joined as participants in the scheduled conference; and
    if all of the key invitees have joined the scheduled conference, stopping the recording of the conference media and deleting the conference media file.

20. The logic of claim 19, further operable to perform the steps of:
    detecting completion of the scheduled conference;
    determining missing ones of the key invitees that did not join the scheduled conference; and
    notifying the missing invitees of the availability of the conference media file.

21. The logic of claim 20, wherein the step of notifying comprises communicating an electronic mail message to each of the missing invitees.

22. The logic of claim 21, wherein each of the electronic mail messages comprises a copy of the conference media file.

23. The logic of claim 19, wherein the scheduled conference comprises a media communication session operable to interconnect media stream communications between at least three connecting participants.

24. The logic of claim 19, further operable to perform the steps of:
    determining whether all of the key invitees have joined as participants in the scheduled conference after a predetermined period of time following a scheduled time for the schedule conference; and if all of the key invitees have not joined the scheduled conference by the end of the predetermined period of time, saving the conference media file for later access by any missing participants.

25. The logic of claim 19, further operable, prior to the scheduled conference, to present a graphical user interface that includes fields for specifying a scheduled time and addresses for the key invitees.

26. The logic of claim 19, further operable, prior to the scheduled conference, to determine all scheduled invitees for the scheduled conference and to communicate a notice to each of the scheduled invitees, with each of the notices specifying parameters for the scheduled conference.

27. The logic of claim 26, wherein each of the notices includes a contact address for the scheduled conference and a pass code, wherein the pass code from a notice distinguishes whether a scheduled invitee is one of the key invitees.

28. An automated conference media recording module comprising:

means for determining key invitees for a scheduled conference;

means for connecting to the scheduled conference;

means for initiating recording of conference media from the scheduled conference into a conference media file;

means for monitoring participants in the scheduled conference;

means for determining whether all of the key invitees have joined as participants in the scheduled conference; and means for, if all of the key invitees have joined the scheduled conference, stopping the recording of the conference media and deleting the conference media file.

29. A method for automated recording of conference media comprising:

determining key invitees for a scheduled conference;

connecting to the scheduled conference;

initiating recording of conference media from the scheduled conference into a conference media file;

monitoring participants in the scheduled conference;

determining that all of the key invitees have not joined as participants in the scheduled conference after a predetermined period of time following a scheduled time for the schedule conference;

detecting completion of the scheduled conference;

determining missing ones of the key invitees that did not join the scheduled conference; and communicating an electronic mail message to each of the missing invitees, wherein each of the electronic mail messages comprises a copy of the conference media file.

* * * * *

UNITED STATES PATENT AND TRADEMARK OFFICE
CERTIFICATE OF CORRECTION

PATENT NO. : 7,590,230 B1  Page 1 of 1
APPLICATION NO. : 10/444793
DATED : September 15, 2009
INVENTOR(S) : Luke K. Surazski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1239 days.

Signed and Sealed this

Twenty-first Day of September, 2010

David J. Kappos
*Director of the United States Patent and Trademark Office*